United States Patent
Takeuchi et al.

(10) Patent No.: US 10,162,663 B2
(45) Date of Patent: Dec. 25, 2018

(54) COMPUTER AND HYPERVISOR-BASED RESOURCE SCHEDULING METHOD

(71) Applicant: Hitachi, Ltd., Tokyo (JP)

(72) Inventors: Tadashi Takeuchi, Tokyo (JP); Sachie Tajima, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 282 days.

(21) Appl. No.: 15/035,490

(22) PCT Filed: Feb. 17, 2014

(86) PCT No.: PCT/JP2014/053613
§ 371 (c)(1),
(2) Date: May 10, 2016

(87) PCT Pub. No.: WO2015/122007
PCT Pub. Date: Aug. 20, 2015

(65) Prior Publication Data
US 2016/0378533 A1 Dec. 29, 2016

(51) Int. Cl.
*G06F 9/455* (2018.01)
*G06F 9/50* (2006.01)
*G06F 11/14* (2006.01)
*G06F 11/34* (2006.01)

(52) U.S. Cl.
CPC ........ *G06F 9/45558* (2013.01); *G06F 9/5011* (2013.01); *G06F 9/5022* (2013.01); *G06F 9/5077* (2013.01); *G06F 11/1484* (2013.01); *G06F 11/3409* (2013.01); *G06F 2009/45579* (2013.01)

(58) Field of Classification Search
CPC .. G06F 9/455; G06F 9/45533; G06F 9/45541; G06F 9/45545; G06F 9/4555; G06F 9/45558; G06F 9/50; G06F 9/5011; G06F 9/5016; G06F 9/5027; G06F 9/5077; G06F 9/5022; G06F 2009/45583
See application file for complete search history.

(56) References Cited

U.S. PATENT DOCUMENTS

| 7,743,375 | B2 * | 6/2010 | Goodman | G06F 12/0646 709/215 |
| 7,814,495 | B1 * | 10/2010 | Lim | G06F 9/45558 718/104 |
| 8,316,374 | B2 * | 11/2012 | Lim | G06F 9/45558 718/104 |

(Continued)

OTHER PUBLICATIONS

"The CPU scheduler in VMware vSphere 5.1", VMware Technical white paper, 2013.

(Continued)

*Primary Examiner* — Hiren P Patel
(74) *Attorney, Agent, or Firm* — Mattingly & Malur, PC

(57) ABSTRACT

A simple hypervisor, in addition to a hypervisor, is operated on a computer. A guest OS, the continued operations of which need to be guaranteed, when a fault occurs in the hypervisor is operated on the simple hypervisor, and the other guest OSs are operated on the hypervisor. The hypervisor performs resource scheduling (determining of resources to be allocated to or deallocated from each guest OS) and the simple hypervisor executes, in place of the simple hypervisor, allocation or deallocation of resources to or from the guest OS, the continued operations of which need to be guaranteed.

20 Claims, 12 Drawing Sheets

(56) References Cited

U.S. PATENT DOCUMENTS

| | | | | |
|---|---|---|---|---|
| 8,499,112 B2* | 7/2013 | Mine | G06F 9/45533 | 710/200 |
| 8,607,230 B2* | 12/2013 | Hatta | G06F 9/5077 | 718/1 |
| 8,635,057 B2* | 1/2014 | Ganguly | G06F 9/45558 | 703/27 |
| 8,898,666 B2* | 11/2014 | Saito | G06F 9/5077 | 718/1 |
| 8,997,098 B2* | 3/2015 | Lee | G06F 9/45558 | 718/1 |
| 9,075,642 B1* | 7/2015 | Chalmer | G06F 9/45533 | |
| 9,207,939 B2* | 12/2015 | Hattori | G06F 9/30076 | |
| 9,317,320 B2* | 4/2016 | Lee | G06F 9/45558 | |
| 9,542,226 B2* | 1/2017 | Bieswanger | G06F 9/5011 | |
| 2006/0010440 A1* | 1/2006 | Anderson | G06F 9/45533 | 718/1 |
| 2009/0089815 A1* | 4/2009 | Manczak | G06F 9/4411 | 719/327 |
| 2009/0327643 A1* | 12/2009 | Goodman | G06F 9/5077 | 711/173 |
| 2011/0113426 A1* | 5/2011 | Kung | G06F 9/45558 | 718/1 |
| 2011/0119670 A1* | 5/2011 | Sugumar | G06F 9/5088 | 718/1 |
| 2014/0123138 A1* | 5/2014 | Lee | G06F 9/45558 | 718/1 |
| 2014/0282498 A1* | 9/2014 | Rosato | G06F 9/45533 | 718/1 |
| 2014/0282508 A1* | 9/2014 | Plondke | G06F 9/45533 | 718/1 |
| 2014/0317619 A1* | 10/2014 | Tajima | G06F 9/455 | 718/1 |

OTHER PUBLICATIONS

International Search Report of PCT/JP2014/053613 dated Apr. 1, 2014.

* cited by examiner

FIG. 3

Request log table
131

| Resource type | CPU | Memory | Memory | Memory | ... |
|---|---|---|---|---|---|
| Number | 2 | 4 | - | 5 | |
| Old state | 1 | F | 1 | - | |
| New State | 2 | 1 | 2 | 2 | |
| Guest physical number | - | - | - | 9 | |
| Processing state | Completed | In processing | In processing | In processing | |

CPU allocation state table
132

| CPU number | 0 | 1 | 2 | 3 | 4 | ... | ... | ... |
|---|---|---|---|---|---|---|---|---|
| Allocation destination | 1 | 1 | # | F | 2 | | | |

Memory allocation state table
133

| Host physical page number | 0 | 1 | 2 | 3 | 4 | ... | ... | ... |
|---|---|---|---|---|---|---|---|---|
| Guest physical page number | 13 | 8 | F | 14 | # | | | |
| Allocation destination | 1 | 2 | F | 1 | # | | | |

Address conversion table
134

| V⁹⁰¹ | Guest OS number⁹⁰² | Guest physical page number⁹⁰³ | Host physical page number⁹⁰⁴ |
|---|---|---|---|
| | | | |
| | | | |
| | | | |

FIG. 10

CPU usage history management table
1001

| Guest OS number¹⁰¹¹ | Smallest CPU amount¹⁰¹² | Largest CPU amount¹⁰¹³ | Allocated CPU aggregate¹⁰¹⁴ |
|---|---|---|---|
| | | | |
| | | | |

FIG. 11

Memory usage history management table
1101

| Guest OS number¹¹¹¹ | Smallest memory¹¹¹² | Largest memory amount¹¹¹³ | Allocated memory aggregate¹¹¹⁴ |
|---|---|---|---|
| | | | |
| | | | |

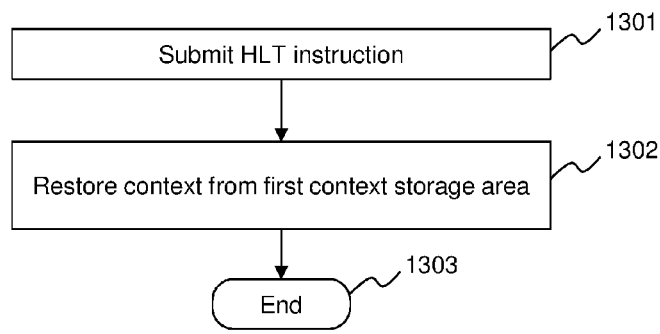
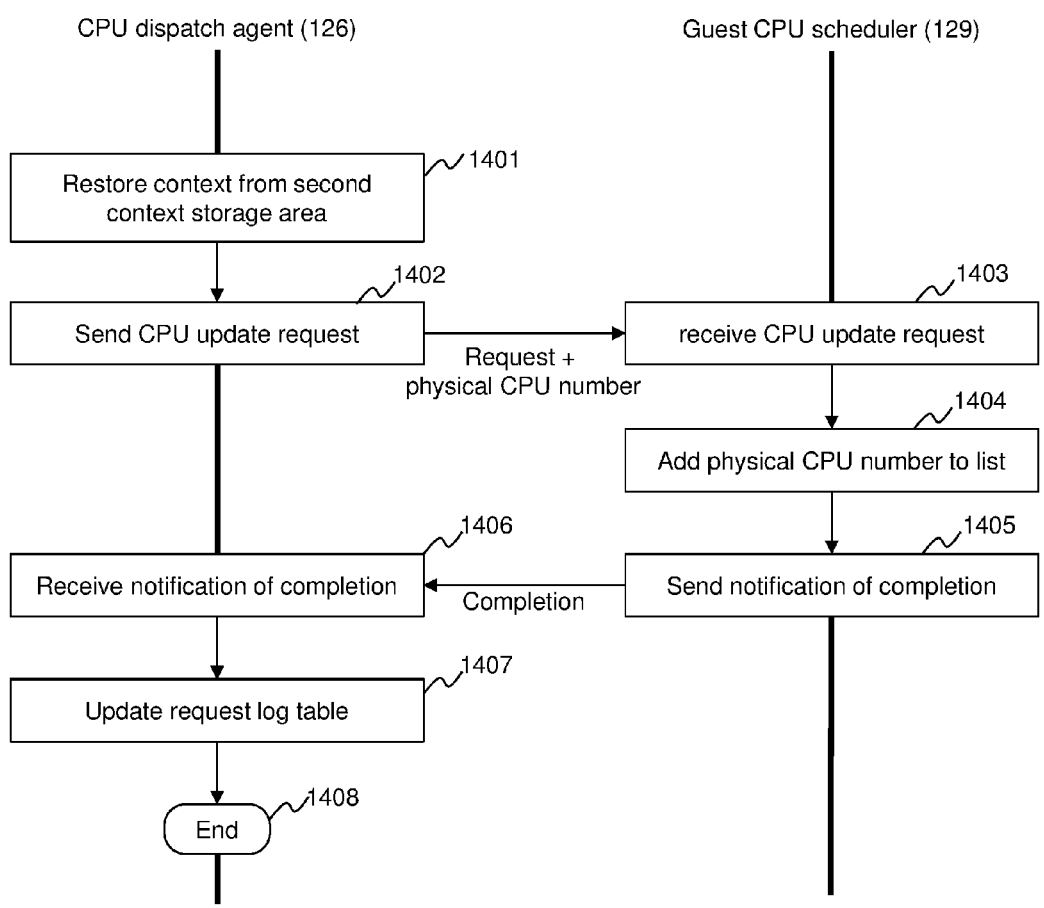

COMPUTER AND HYPERVISOR-BASED RESOURCE SCHEDULING METHOD

TECHNICAL FIELD

The present invention generally relates to hypervisor-based resource scheduling.

BACKGROUND ART

A computer that operates a plurality of guest OSs using a hypervisor is known. In such a computer, the amount of resource allocated to each guest OS is adjusted according to a load using the dynamic resource scheduling function of the hypervisor. General examples of resources include physical memories and physical CPUs (Central Processing Units). Moreover, a computer in which a plurality of guest OSs is present in the same casing is also known.

Guaranteed high-availability is essential depending on an application to which such a computer is applied. An example of such an application is a mission-critical application. A hypervisor is a mechanism (typically a computer program or a hardware circuit in which a computer program is embedded) having many functions. Thus, it is difficult to raise the availability of the hypervisor to such a level that the hypervisor can be applied to a mission-critical application. Thus, it is generally difficult to mount a hypervisor on a mission-critical computer.

NPL 1 discloses a hypervisor-based resource scheduling method. According to this method, a CPU scheduler (an example of a resource scheduler) of a hypervisor performs the same operation as a CPU scheduler of an OS (Operating System).

A hypervisor provides virtual execution environments (virtual computers) and handles processes of a guest OS operating on a virtual CPU of each virtual computer as processors. The CPU scheduler on a physical CPU determines which guest OS (processor) is to be scheduled. Further, the hypervisor also executes a process (a resource dispatch/preempt process) of switching the execution context on the physical CPU.

CITATION LIST

Non Patent Literature

[NPL 1]
VMware Inc., "The CPU scheduler in VMware vSphere 5.1," VMware technical white paper, 2013.

SUMMARY OF INVENTION

Technical Problem

In the method, when a fault occurs in the hypervisor, all guest OS cannot continue operating. This is because the process of dispatching and preempting (allocating and deallocating) resources to and from the guest OS is not executed due to a fault in the hypervisor. All guest OSs cannot use resources (CPUs, memories, and the like) required for operations and cannot continue operating.

Solution to Problem

A simple hypervisor in addition to a hypervisor operates on a computer. The hypervisor has a function of emulating a plurality of resources including one or more physical memories and a plurality of physical CPUs and a function of scheduling resources (determining a resource to be allocated to or deallocated from each guest OS). The simple hypervisor has an agent function of allocating or deallocating resources to or from the guest OS in place of the hypervisor. A first guest OS (for example, a guest OS of which continued operations are to be guaranteed when a fault occurs in the hypervisor) operates on the simple hypervisor, and a second guest OS (a guest OS other than the first guest OS) operates on the hypervisor. The hypervisor performs resource scheduling and the simple hypervisor executes allocation or deallocation of resources to or from the first guest OS in place of the simple hypervisor.

Advantageous Effects of Invention

Continued operations of the first guest OS can be guaranteed even if a fault occurs in the hypervisor.

BRIEF DESCRIPTION OF DRAWINGS

FIG. 3 illustrates a data structure of a dispatch/preempt request log.

FIG. 4 illustrates a data structure of a CPU allocation state.

FIG. 5 illustrates a data structure of a memory allocation state.

FIG. 9 illustrates a data structure of an address conversion table.

FIG. 10 illustrates a data structure of a CPU usage history management table.

FIG. 11 illustrates a data structure of a memory usage history management table (1001).

FIG. 13 illustrates an operation flow of a CPU scheduler (when a trap return instruction is submitted from a CPU dispatch agent).

FIG. 14 illustrates an operation flow of a CPU dispatch agent and a first guest OS CPU scheduler (when a dispatch request is submitted).

DESCRIPTION OF EMBODIMENTS

Hereinafter, an embodiment will be described.

In the following description, although information is often described as the expression of "kkk table," information may be expressed as a data structure other than the table. In order to show that the information does not depend on a data structure, the "kkk table" may be referred to as "kkk information".

In the following description, there may be cases where processing is described using a "program" as the subject. However, since the processing is performed while using a storage resource (for example, a memory) and/or a communication interface device (for example, a communication port) as necessary when a program is executed by a physical CPU, the physical CPU may also be used as the subject of the processing. Conversely, it may be understood that processing described using the physical CPU as the subject is performed by executing one or more programs. Moreover, a physical CPU may include a hardware circuit that performs a part or all of the processes performed by the processor and may be each core of a multi-core processor. A computer program may be installed in respective computers from a program source. The program source may be a program distribution server or a storage medium, for example.

Figure 1:
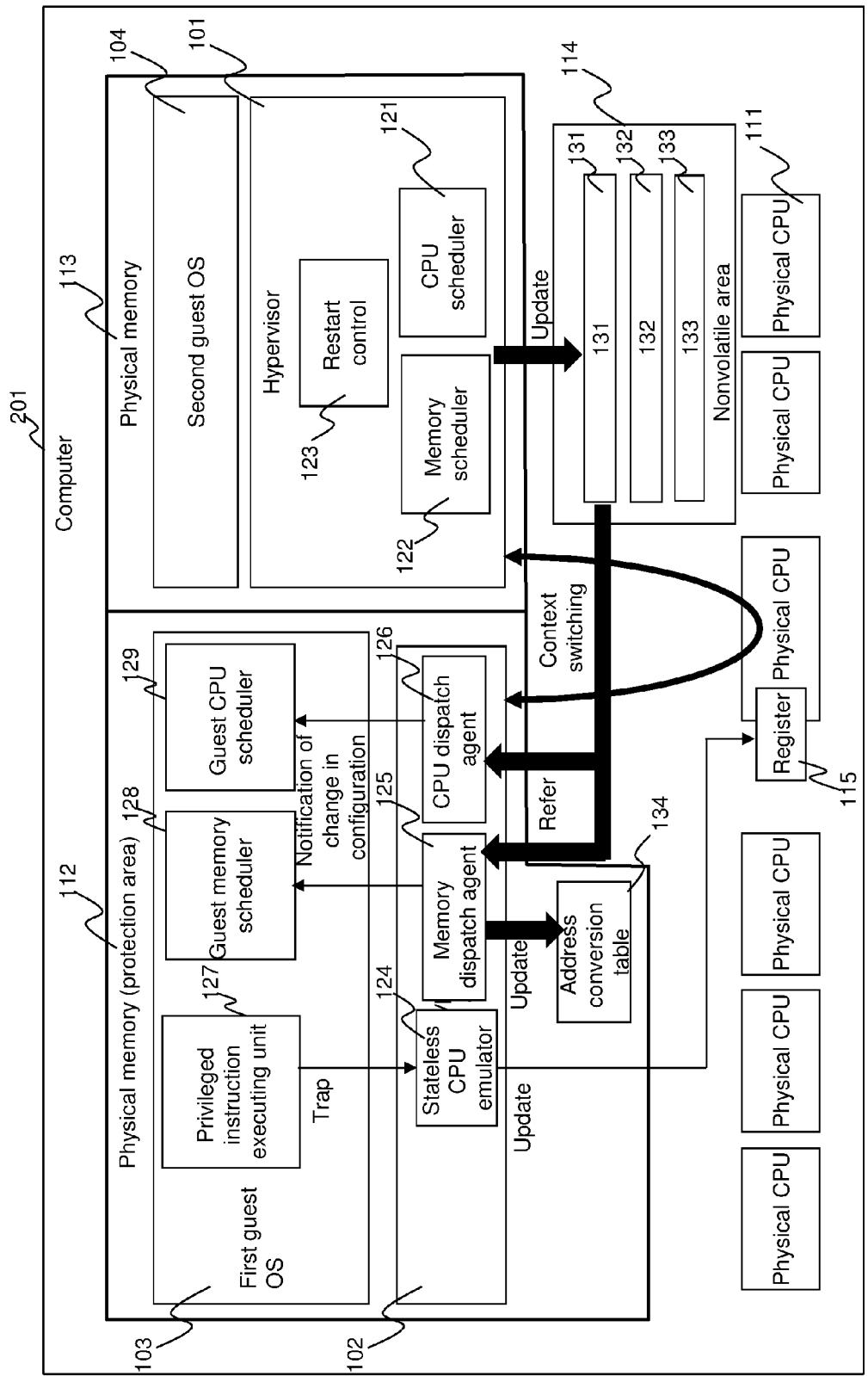
FIG. 1 illustrates a system configuration employed in an embodiment of the present invention.

FIG. 1 illustrates an outline of an embodiment.

A computer 201 includes a plurality of physical CPUs 111 and a plurality of resources (physical resources) including physical memories 112 and 113. The physical memory 112 is an example of a first physical memory area and the physical memory 113 is an example of a second physical memory area. The physical memories 112 and 113 may be a plurality of memory areas secured from memory areas of an integrated physical memory.

The computer 201 includes a hypervisor agent 102 in addition to a hypervisor 101, which provide a virtual computer environment. The hypervisor agent 102 is an example of a simple hypervisor. A first guest OS 103 operates on a virtual computer provided by the hypervisor agent 102, and a second guest OS 104 operates on a virtual computer provided by the hypervisor 101. Resource scheduling of dynamically allocating or deallocating resources is performed on the first and second guest OSs 103 and 104. In the present embodiment, examples of resources dynamically allocated or deallocated include physical CPUs and memory areas (in the present embodiment, sometimes referred to as "pages").

The resource used for operations of the hypervisor agent 102 may be only the resource that the first guest OS 103 can use (that is, the hypervisor 101 does not use) among the plurality of resources. The hypervisor agent 102 can virtualize memories by updating an address conversion table 134 showing correspondence between a logical address (in the present embodiment, a guest physical page number) designated from a guest OS and a physical address (in the present embodiment, a host physical page number) corresponding to the logical address. In this way, it is possible to control a memory area (page) that the first guest OS 103 can access. The address conversion table 134 may be an EPT (extension page table) or a DWAR (DMA (Direct Memory Access) Remapping) table, for example.

Although the hypervisor 101 determines resource scheduling, allocation or deallocation of resources with respect to the first guest OS 103 is executed by the hypervisor agent 102 in place of the hypervisor.

The hypervisor 101 submits a resource dispatch/preempt (allocation/deallocation) request by writing the request in a nonvolatile area (nonvolatile storage area) 114. The hypervisor agent 102 reads the request from the nonvolatile area 114 and executes a process corresponding to the request. A volatile storage area may be employed instead of the nonvolatile area 114. Moreover, the nonvolatile area 114 may be provided outside the computer 201 (see FIG. 2).

If the request is a CPU dispatch request, the context of a dispatch target physical CPU is switched from the hypervisor 101 to the hypervisor agent 102, and the physical CPU operates on the hypervisor agent 102. Further, the hypervisor agent 102 notifies the first guest OS 103 that the physical CPU has become usable. As a result, the first guest OS 103 can start operating on the physical CPU.

If the request is a physical CPU preempt request, the hypervisor agent 102 notifies the first guest OS 103 that the physical CPU has become unusable. As a result, the first guest OS 103 will not operate on the physical CPU. Further, the context of the preempt target physical CPU is switched from the hypervisor agent 102 to the hypervisor 101.

If the request is a memory dispatch request or a memory preempt request, a process of updating the address conversion table 134 is executed so that the access of the first guest OS 103 to the designated memory area is enabled or disabled. In this case, the hypervisor agent 102 sends a notification to the first guest OS 103 and the first guest OS 103 can recognize that access to the memory area is enabled or disabled.

In a virtual computer environment provided by the hypervisor agent 102, the physical memories 112 and 113 are virtualized but the physical CPUs are not virtualized. That is, the first guest OS 103 occupies and executes a register 115 on the physical CPU 111 while updating the register by itself. However, the first guest OS 103 accesses the physical memories 112 and 113 with the aid of the address conversion table 134. In this case, the address space of the physical memory is converted, and the first guest OS 103 cannot recognize the presence of a partial physical memory (area).

In order to realize dynamic resource scheduling, the hypervisor 101 includes a CPU scheduler 121 and a memory scheduler 122. These schedulers determine allocation of the physical CPU 111 and the physical memories 112 and 113 to the first and second guest OSs 103 and 104.

The hypervisor agent 102 includes a CPU dispatch agent 126, a memory dispatch agent 125, and a stateless CPU emulator 124.

The scheduler does not perform the process of dispatching the physical CPU (111) and physical memories 112 and 113 to the first guest OS by itself but submits a resource dispatch/preempt request with the aid of the nonvolatile area 114. By referring to this request, the CPU dispatch agent 126 or the memory dispatch agent 125 of the hypervisor agent 102 performs CPU/memory dispatch process.

A CPU dispatch process involves switching the execution context of the physical CPU 111. In this way, the guest OS operating on the physical CPU 111 is switched. Moreover, a memory dispatch process involves setting (updating) the address conversion table 134. In this way, it is possible to enable or disable partially new areas of the physical memory 112 to be accessed from the first guest OS 103. The first guest OS 103 includes a guest CPU scheduler 129, a guest memory scheduler 128, and a privileged instruction executing unit 127. In order to realize the dispatch process, the hypervisor agent 102 performs collaboration with the guest CPU scheduler 129 and the memory scheduler 128

With the configuration described above, it is possible to realize dynamic scheduling of CPU/memory resources used by the first and second guest OSs 103 and 104.

In a system configuration employed in the present embodiment, the first guest OS 103 executes processes directly on the physical CPU 111. However, depending on the physical CPU 111, when a memory virtualization function of the address conversion table 134 is used, privileged instructions of the first guest OS 103 may be trapped. In order to guarantee direct execution in such cases, the hypervisor agent 102 includes the stateless CPU emulator 124 described above. The stateless CPU emulator 124 executes a process of updating the register 115 on the physical CPU 111 depending on the trapped privileged instruction.

In order to allow the first guest OS 103 and the hypervisor agent 102 to continue operating and to allow the hypervisor 101 and the second guest OS 104 to restart and continue performing processes even if a fault occur in the hypervisor 101, the hypervisor agent 102 and the first guest OS 103 are arranged in a protection area of the physical memory 112 (that is, an area in which the hypervisor 101 and the second guest OS 104 cannot write data). The hypervisor 101 and the second guest OS 104 cannot destroy data or codes in this area. Moreover, the hypervisor 101 includes a restart control 123. The nonvolatile area 114 stores a request log table 131, a CPU allocation state table 132, and a memory allocation state table 133, and the restart control 131 refers to these items of information 131 to 133 stored in the nonvolatile area 114. The restart control 123 performs standby until processes corresponding to submitted requests registered in the request log table 131 are completed. Further, the restart control 123 performs these startup processes using only the CPUs/memories that the hypervisor 101 and the second guest OS 104 can use according to a CPU/memory allocation state.

Dispatch of resources used by the first guest OS 103 is performed by the hypervisor agent 102 in place of the hypervisor 101. Moreover, CPU emulation during execution of the first guest OS 103 is also performed by the hypervisor agent 102 rather than the hypervisor 101. That is, even if a fault occurs in the hypervisor 101, the first guest OS 103 and the hypervisor agent 102 can continue operating. The functions provided by the hypervisor agent 102 are smaller (for example, far smaller) than those of the hypervisor 101. Thus, it is considered that the first guest OS 103 can easily continue operating even if a fault occurs in the hypervisor 101.

The request log table 131, the CPU allocation state table 132, and the memory allocation state table 133 are stored in the nonvolatile area 114 so that these tables can be referred to even after the hypervisor 101 is restarted. With this configuration, even after a fault occurs in the hypervisor, the second guest OS 104 and the hypervisor 101 only can restart and continue performing processes.

Hereinafter, the present embodiment will be described in detail.

Figure 2:
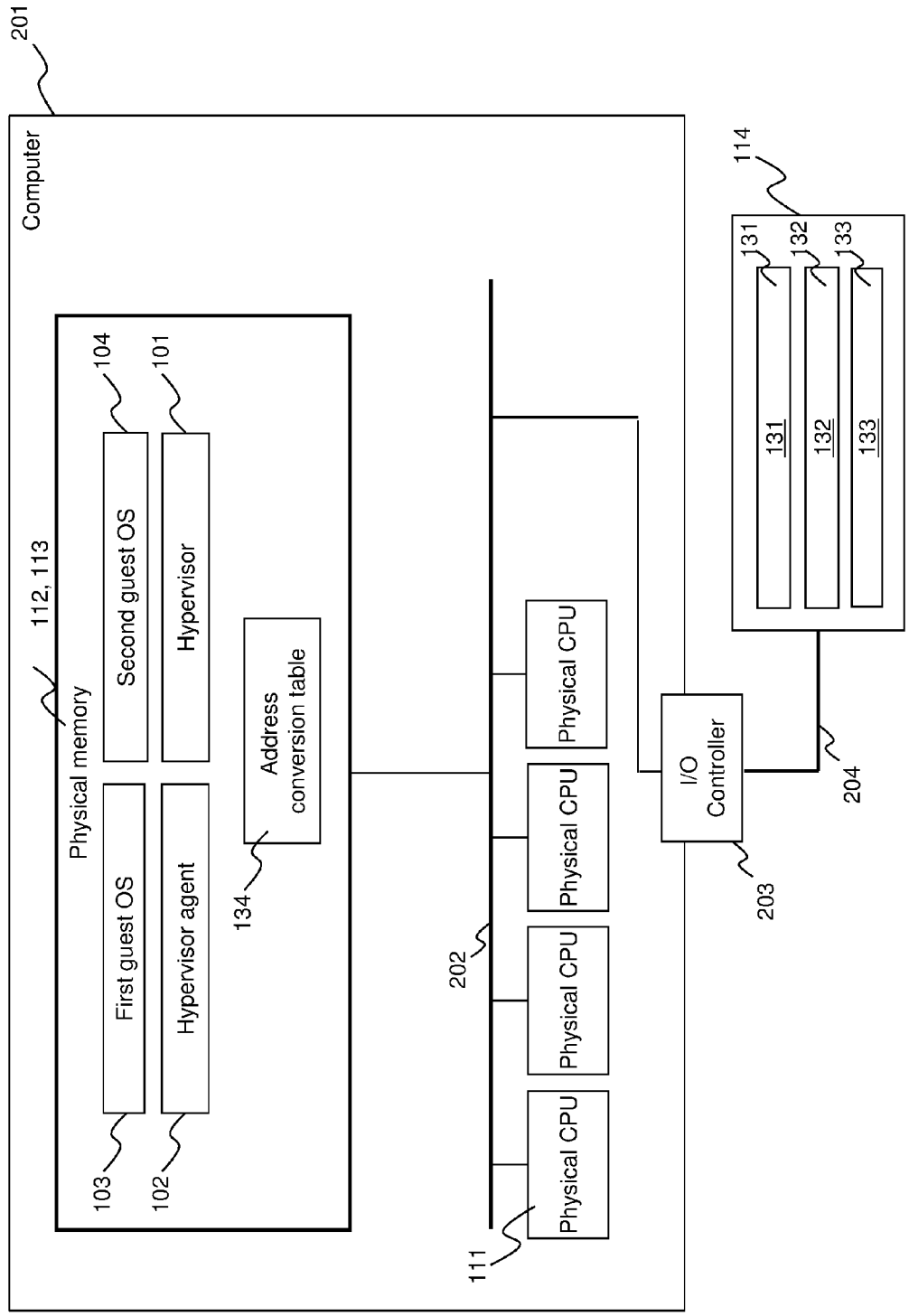
FIG. 2 illustrates a hardware configuration employed in a practical example of the present invention.

FIG. 2 illustrates a hardware configuration of the computer 201.

Programs such as the first guest OS 103, the hypervisor agent 102, the second guest OS 104, and the hypervisor 101 are arranged in the physical memories 112 and 113 of the computer 201. The physical memories 112 and 113 are connected to a plurality of physical CPUs 111 via a CPU bus 202 so as to communicate with each other. At least one of the plurality of physical CPUs 111 reads and executes the programs. The address conversion table 134 is arranged in the physical memories 112 and 113 and is used for controlling address conversion for memory access when executing the first and second guest OSs 103 and 104. The request log table 131, the CPU allocation state table 132, the memory allocation state table 133 are arranged in the nonvolatile area 114. The computer 102 includes an I/O (Input/Output) controller 203, the nonvolatile area 114 can be accessed from a program executed on the physical CPU 111 via the I/O controller 203 and an I/O cable 204. For example, when read operations are performed, the program submits an I/O request to the I/O controller 203. The I/O controller 203 reads data on the nonvolatile area 114 via the I/O cable 204 and writes the read data to the physical memories 112 and 113 via the CPU bus 202. A program operating on the physical CPU 111 acquires the written data via the CPU bus 202. The I/O cable 204 may be a cable of a communication network.

FIG. 3 illustrates a configuration of the request log table 131.

The request log table 131 is a table for managing logs including a resource dispatch/preempt request submitted by the CPU scheduler 121 and the memory scheduler 122 and a processing state of the request by the CPU dispatch agent 126 and the memory agent 125. This table includes a resource type field 301, a number field 302, an old state field 303, a new state field 304, a guest physical number field 305, and a processing state field 306 for respective requests. One column corresponds to the logs of one request.

The resource type field 301 indicates whether a dispatch/preempt target is a CPU.

The number field 302 indicates a number (identification number) of a dispatch/preempt target resource. When a CPU is a dispatch target, the number field 302 indicates the number of a dispatch target physical CPU. When a memory is a dispatch target, the number field 302 indicates a host physical page number of a dispatch target memory area (page) and a page identification number.

The old state field 303 and the new state field 304 indicate the numbers of a guest OS that can use the target resource before and after the dispatch/preempt process, respectively. In an empty state where the target resource is not allocated to any guest OS, at least one of the old and new state fields 303 and 304 may have a value "F" indicating the empty state.

The guest physical number field 305 is used in special cases only where the hypervisor 101 submits a request for setting the address conversion table 134 to the hypervisor agent 102 unlike the case where the hypervisor 101 submits a resource dispatch/preempt request. In the present embodiment, the address conversion table 134 is shared by the hypervisor 101 and the hypervisor agent 102. In this case, in order to prevent the address conversion table 134 from being destroyed by the hypervisor 101, the address conversion table 134 is arranged in the physical memory (protection area) 112. When the hypervisor 101 updates the address conversion table 134, the hypervisor 101 submits an address change request in which information (for example, the number field 302 and the new state field 304) required for setting is designated to the memory dispatch agent 125.

The processing state field 306 indicates a processing state of the dispatch/preempt process corresponding to the request. When a request is submitted, the CPU scheduler 121 and the memory scheduler 122 update the processing state field 306 corresponding to the request to "In Processing". Moreover, when the process corresponding to the request is completed, the CPU dispatch agent 126 and the memory dispatch agent 125 update the processing state field 306 corresponding to the request to "Completed".

Depending on the request type, only portions of the fields are used. For example, when the request is a CPU dispatch/preempt request, the guest physical number field 205 is not used.

Three memory dispatch/preempt requests are used, including a dispatch request of allocating a memory area (page) to the first guest OS 103, a preempt request of deallocating a memory area from the guest OS 103, and an address update request of updating the addresses of the address conversion table 134 submitted by the hypervisor 101. In the case of the dispatch request, the guest physical number field 305 is not used. In the case of the preempt request, the number field 302 and the guest physical number field 305 are not used (the request may deallocate only one optional page which is currently used by the first guest OS 103). Moreover, in the case of the address switching request, the old state field 303 is not used (this is because the owner of the resource before and after the request is submitted is not changed).

FIG. 4 illustrates a configuration of the CPU allocation state table 132.

The CPU allocation state table 132 includes a CPU number field 401 and an allocation destination field 402 for respective physical CPUs. The CPU number field 401 indicates a number (identification number) of the physical CPU 111, and the allocation destination field 402 indicates a number (identification number) of the guest OS to which the corresponding physical CPU 111 is allocated. The physical CPU 111 of which the allocation destination guest OS is not present and which is empty, the allocation destination field 402 may have a value "F" indicating an empty state. Moreover, for the physical CPU 111 which is in the dispatch/preempt process, the allocation destination field 402 may have a value "#" indicating that the physical CPU 111 is in processing.

FIG. 5 illustrates a configuration of the memory allocation state table 133.

The memory allocation state table 133 includes a host physical page number field 501, a guest physical page number field 502, and an allocation destination field 503 for respective pages. The host physical page number field 501 indicates a number (identification number) of a page and corresponds to a physical address. The guest physical page number field 502 indicates a page number recognized by the guest OS and corresponds to a logical address. The allocation destination field 503 indicates a number of the guest OS to which the page is allocated. For pages of which the allocation destination guest OS is not present and which are empty, the guest physical page number field 502 and the allocation destination field 503 may have a value "F" indicating an empty state. Moreover, for pages which are in the dispatch/preempt process, the guest physical page number field 502 and the allocation destination field 503 may have a value "#" indicating that the pages are in processing.

Figure 6:
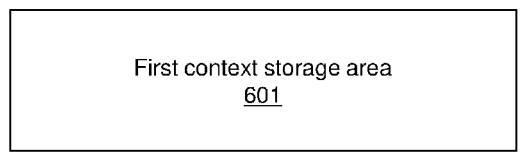
FIG. 6 illustrates a data structure of a hypervisor context storage area.

FIG. 6 illustrates a first context storage area 601.

The first context storage area 601 may be a partial area of the physical memory 113. The first context storage area 601 is used when the CPU scheduler 121 performs a CPU dispatch/preempt process. The CPU scheduler 121 saves and recovers the execution context of the hypervisor agent 102 using the first context storage area 601.

Figure 7:
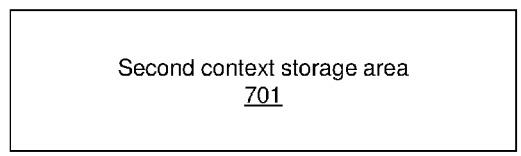
FIG. 7 illustrates a data structure of a hypervisor agent context storage area.

FIG. 7 illustrates a second context storage area 701.

The second context storage area 701 may be a partial area of the physical memory 112. The CPU dispatch agent 126 saves the execution context of the hypervisor 101 in the data structure before submitting a CPU dispatch request. Moreover, after the process corresponding to the preempt request is completed, the execution context of the hypervisor 101 is recovered from the second context storage area 701.

Figure 8:
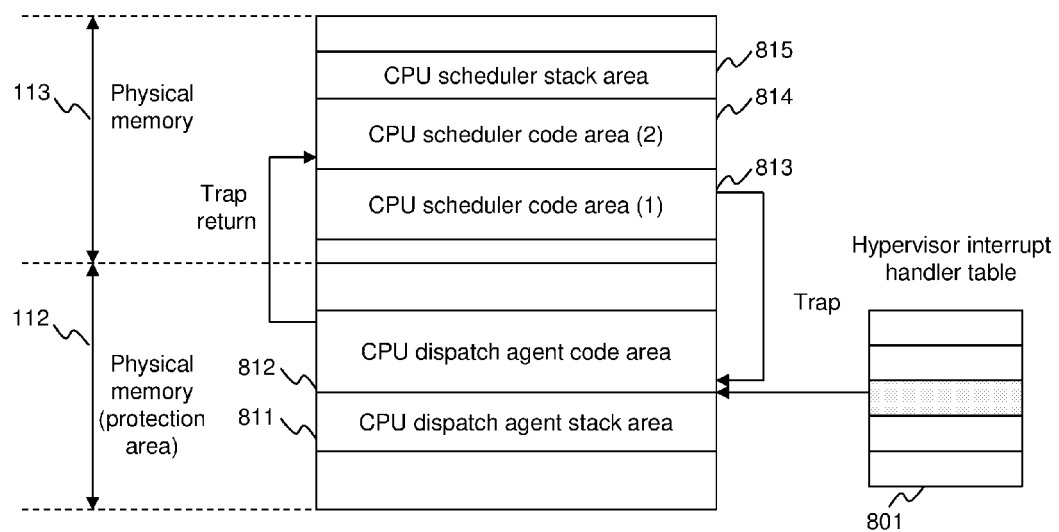
FIG. 8 illustrates a layout of code areas and stack areas used during a dispatch/preempt process.

FIG. 8 illustrates the layout of code areas and stack areas.

A code area and a stack area are used when performing a process of dispatching and preempting the physical CPU 111. A CPU dispatch/preempt request is submitted by the CPU scheduler 121. A code for performing the process is arranged in a CPU scheduler code area (1) 813. Moreover, a stack used when performing the process is arranged in a CPU scheduler stack area 815. These areas are arranged on the physical memory 113.

The dispatch request of the physical CPU 111 is submitted by submitting a trap instruction. In this case, a jump destination is registered in an interrupt handler table 801 that is managed by the hypervisor 101, and jumping to the CPU dispatch agent 126 is realized with the aid of the table 801. Codes of a process performed by the CPU dispatch agent 126 are arranged in a CPU dispatch agent code area 812. In this case, switching of stacks occur simultaneously, and new stacks are arranged in a CPU dispatch agent stack area 811. These areas are arranged on the physical memory (protection area) 112.

A CPU preempt request is submitted by sending an interrupt notification to a preempt target physical CPU 111. After an interrupt on the preempt target physical CPU 111 occurs, referring, jumping, and stack switching of the interrupt handler table 801 occur similarly to the above, and the CPU dispatch agent 126 is started.

When the CPU dispatch agent 126 completes the preempt process, the control returns to the CPU scheduler 121 by trap return. The codes of the processes executed thereafter are arranged in a CPU scheduler code area (2) 814. In this case, stacks to be used are changed to the stacks present in a CPU scheduler stack area 815. These areas are arranged on the physical memory 113.

When the CPU dispatch agent 126 completes the dispatch process, the control does not return to the CPU scheduler 121 because the dispatched physical CPU 111 is occupied and executed by the hypervisor agent 102 and the first guest OS 103. When the preempt process is completed, the control returns to the CPU scheduler 121.

FIG. 9 illustrates a configuration of the address conversion table 134.

The address conversion table 134 includes the following fields for respective entries (records), including a V field 901 storing a value indicating whether an entry is valid or invalid, a guest OS number field 902 indicating a number of a page allocation destination guest OS, a guest physical page number field 903 indicating a page number designated from a guest OS, and a host physical page number field 904 correlated with a guest physical page number.

FIG. 10 illustrates a configuration of a CPU usage history management table 1001.

The CPU usage history management table 1001 is a table managed by the CPU scheduler 121 and is arranged in the physical memory 113, for example. The CPU usage history management table 1001 includes a guest OS number field 1011, a smallest CPU amount field 1012, a largest CPU amount field 1013, and an allocated CPU aggregate field 1014 for respective guest OSs. The guest OS number field 1011 indicates a number of the guest OS, the smallest CPU amount field 1012 indicates a lower limit of the CPU amount allocated to the guest OS, the largest CPU amount field 1013 indicates an upper limit of the CPU amount allocated to the guest OS, and the allocated CPU aggregate field 1014 indicates an aggregate of the CPU amounts allocated. The CPU amount may be the number of physical CPUs, for example. A combination of the smallest CPU amount field 1012 and the largest CPU amount field 1013 indicates a range of the amounts of CPU allocated to the guest OS.

FIG. 11 illustrates a configuration of a memory usage history management table 1101.

The memory usage history management table 1101 is a table managed by the memory scheduler 122 and is arranged in the physical memory 113, for example. The memory usage history management table 1101 includes a guest OS number field 1111, a smallest memory amount field 1112, a largest memory amount field 1113, and an allocated memory aggregate 1114 for respective guest OSs. The guest OS number field 1111 indicates a number of the guest OS, the smallest memory amount field 1112 indicates a lower limit of a memory amount allocated to the guest OS, the largest memory amount field 1113 indicates an upper limit of the memory amount allocated to the guest OS, and the allocated memory aggregate field 1114 indicates an aggregate of the memory amounts allocated. The memory amount may be the number of pages or a total volume of pages, for example. A combination of the values of the smallest memory amount field 1112 and the largest amount of memory amount field 1113 indicates a range of the amounts of memories allocated to the guest OS.

The CPU usage history management table 1001 and the memory usage history management table 1101 are stored in the nonvolatile area 114. The tables 1001 and 1101 indicate the largest and smallest resource amounts allocated to each guest OS of the CPU and memory and the total amounts (aggregates) of resources allocated. When performing resource scheduling, the CPU scheduler 121 and the memory scheduler 122 refer to the largest and smallest resource amounts registered in the tables 1001 and 1101 and stop allocation when scheduling exceeding or smaller than the amounts is executed. Moreover, since the allocated resource amount (aggregate) is managed for respective guest OSs, it is possible to charge money corresponding to the resource usage records.

Figure 12:
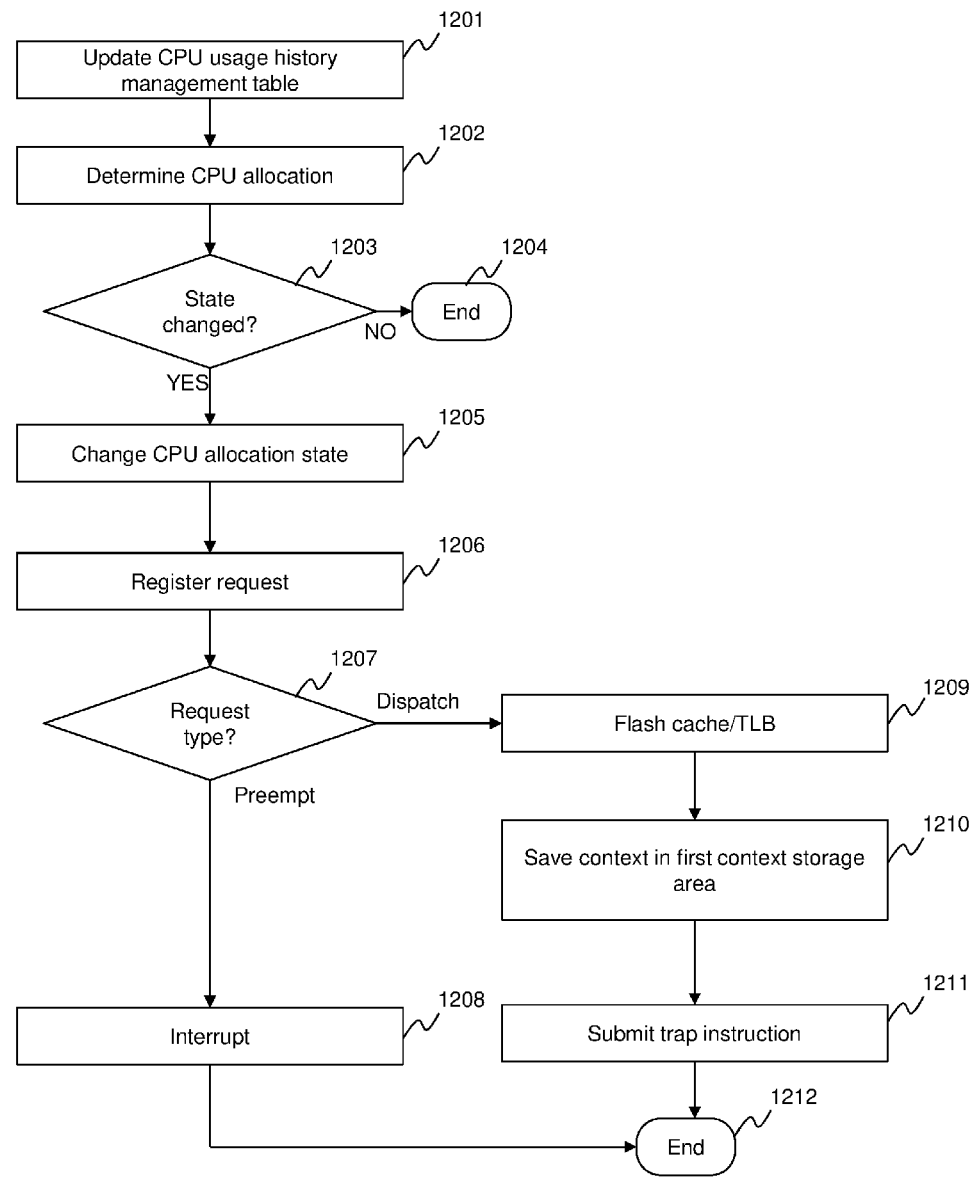
FIG. 12 illustrates an operation flow of a CPU scheduler (during regular startup).

FIG. 12 illustrates an operation flow when the CPU scheduler 121 starts regularly.

In step 1201, the CPU scheduler 121 performs a process of updating the CPU usage history management table 1001. Specifically, for example, the CPU scheduler 121 refers to the CPU allocation state table 132 to calculate the number of CPUs allocated to each guest OS. The CPU scheduler 121 adds the calculated number of allocated CPUs to the value of the allocated CPU aggregate field 1014 of the CPU usage history management table 1001 for each guest OS. With this process, it is possible to manage the aggregate of the CPU usage records and to charge money corresponding to the aggregate.

Hereinafter, in order to facilitate description, a target guest OS—a guest OS—to which a resource is dispatched or preempted will be referred to as a "first guest OS".

In step 1202, the CPU scheduler 121 determines a scheduling target CPU (a physical CPU to be dispatched or preempted) of the first guest OS. In this case, the CPU scheduler 121 specifies a range of CPU amounts (a combination of the values of the smallest CPU amount field 1012 and the largest CPU amount field 1013) of the first guest OS 103 from the CPU usage history management table 1001. When a value obtained by adding or subtracting the amount of the scheduling target CPU to or from the value of the allocated CPU aggregate field 1014 corresponding to the first guest OS 103 exceeds the upper limit of the specified range of CPU amounts or is smaller than the lower limit of the specified range of CPU amount, the CPU scheduler 121 stops the allocation.

In step 1203, the CPU scheduler 121 compares the scheduling state (a combination of the first guest OS 103 and the physical CPU after scheduling) determined in step 1202 with the CPU allocation state table 132 to determine whether there is a change in the allocation (a change in the combination of the first guest OS and the physical CPU).

If there is no change, the CPU scheduler 121 ends the process at step 1204.

If there is a change, in step 1205, the CPU scheduler 121 updates the CPU allocation state table 132 (specifically, for example, the value of the allocation destination field 402 corresponding to the first guest OS 103 is updated to "#").

In step 1206, the CPU scheduler 121 updates the request log table 131. Specifically, for example, the CPU scheduler 121 sets "CPU" to the resource type field 301, sets the number of the scheduling target CPU 111 of the first guest OS 103 to the number field 302, sets the numbers of guest OSs that are to occupy the physical CPU 111 before and after scheduling is executed to the old and new state fields 303 and 304, respectively, and sets "In Processing" to the processing state field 306.

In step 1207, the CPU scheduler 121 determines whether the request that is to be submitted to the CPU dispatch agent 126 is a dispatch request or a preempt request. The flow proceeds to step 1209 if the request is a dispatch request, and the flow proceeds to step 1208 if the request is a preempt request.

In step 1208, the CPU scheduler 121 sends an interrupt notification to the scheduling target CPU 111. The first guest OS 103 and the hypervisor agent 102 operating on the scheduling target CPU 111 stop operating, and then, the control is transferred to the CPU dispatch agent 130. Moreover, stack switching is also performed, and operations are performed using the CPU dispatch agent stack area 811 as the stacks. Then, the flow proceeds to step 1212.

In step 1209, the CPU scheduler 121 submits a privileged instruction for performing a cache/TLB (Translation Lookaside Buffer) flash process (specifically, a process of flashing data in the cache and the TLB to a predetermined storage destination (for example, the nonvolatile area 114)). This privileged instruction is received by the current physical CPU 111 (the physical CPU 111 that executes the hypervisor 101), and the physical CPU 111 performs the cache/TLB flash process. Here, the cache and the TLB may be areas in the physical memory 113.

In step 1210, the CPU scheduler 121 saves the execution context in the first context storage area 601. The execution context stores the value of the register 115 of the current physical CPU (111) (the physical CPU 111 that executes the hypervisor 101), for example.

In step 1211, the CPU scheduler 121 submits a trap instruction. As a result, the CPU dispatch agent 130 starts operating on the physical CPU 111 that is in execution. In this case, the stack areas to be used are changed, and the subsequent processes of the CPU dispatch agent 130 are operated using the stacks of the CPU dispatch agent stack area 811.

In step 1212, the CPU scheduler 121 completes the process.

FIG. 13 illustrates an operation flow of the CPU scheduler 121 that is started in response to a trap return from the CPU dispatch agent 126.

In step 1301, the CPU scheduler 1301 submits a hlt instruction. When the hlt instruction is submitted, the CPU scheduler 1301 performs standby until the restart control 123 described later submits an interrupt notification. There is a possibility that the hypervisor 101 is restarted due to a fault of the hypervisor 101 while the CPU dispatch agent 126 is performing the dispatch/preempt process for the physical CPU 111 as an agent. In this case, the context saved in step 1210 becomes invalid. By performing standby before the context is recovered, it is possible to obviate the use of the invalid context and to allow continued operations after the hypervisor 101 is restarted.

In step 1302, the CPU scheduler 121 recovers the context from the hypervisor context storage area 301. In this case, the respective value of the context in the area 301 are loaded to the register 115 of the physical CPU 111 (the physical CPU 111 that executes the hypervisor 101). After that, operations are performed by the hypervisor 101 and the second guest OS 104 while occupying the physical CPU exclusively.

In step 1303, the CPU scheduler 121 completes the process.

However, the CPU dispatch agent 126 starts operating when a dispatch request is detected (the case of Dispatch) or an interrupt notification from the CPU scheduler 129 is received (the case of Preempt) by referring to the request log table 131 regularly. When a CPU dispatch request is detected, the CPU dispatch agent 126 performs the process of the operation flow illustrated in FIG. 14. When a CPU preempt request is detected, the CPU dispatch agent 126 performs the process of the operation flow illustrated in FIG. 15.

FIG. 14 illustrates an operation flow of the guest CPU scheduler 129 and the CPU dispatch agent 126 that has detected a CPU dispatch request.

In FIG. 14, in step 1401, the CPU dispatch agent 126 recovers the context from the second context storage area 701. Specifically, for example, the CPU dispatch agent 126 loads the respective value of the context in the second context storage area 701 to the register 115 of the physical CPU 111. The physical CPU 111 is the physical CPU 111 that executes the hypervisor agent 102 (that is, the physical CPU 111 that executes the first guest OS 103).

In step 1402, the CPU dispatch agent 126 submits a CPU update request which is a request for updating CPU configuration information to the guest CPU scheduler 129 of the first guest OS 103.

In step 1403, the guest OS scheduler 129 receives the CPU update request. In this case, the number of the dispatch target physical CPU 111 is notified to the guest OS scheduler 129. Specifically, for example, the CPU update request may include the number of the dispatch target physical CPU 111, and the number of the dispatch target physical CPU 111 may be notified to the guest OS scheduler 129 together with the request.

In step 1404, the guest CPU scheduler 129 adds the notified physical CPU number to a scheduling target CPU list of the first guest OS 103. After that, the first guest OS 103 can use the physical CPU 111.

In step 1405, the guest CPU scheduler 129 sends a notification of completion of CPU update to the CPU dispatch agent 126.

In step 1406, the CPU dispatch agent 126 receives the notification of completion.

In step 1407, the CPU dispatch agent 126 updates the request log table 131 (specifically, for example, the value of the processing state field 306 corresponding to the detected dispatch request is updated to "Completed").

In step 1408, the CPU dispatch agent 126 completes the process.

Figure 15:
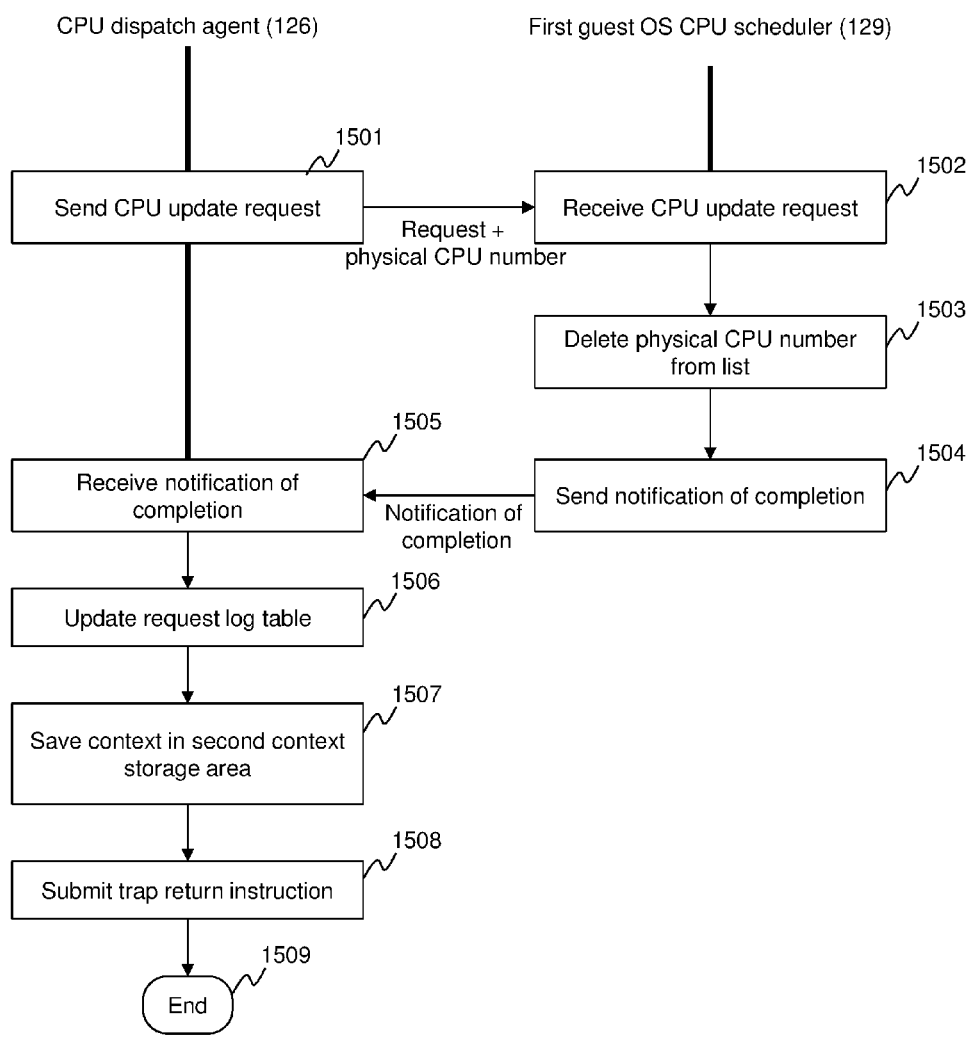
FIG. 15 illustrates an operation flow of a CPU dispatch agent and a first guest OS CPU scheduler (when a preempt request is submitted).

FIG. 15 illustrates an operation flow of the guest CPU scheduler 129 and the CPU dispatch agent 126 that has detected a CPU preempt request.

In step 1501, the CPU dispatch agent 126 sends a CPU update request to the guest CPU scheduler 129 of the first guest OS 103.

In step 1502, the guest CPU scheduler 129 receives the CPU update request. In this case, according to the same method as FIG. 14, the number of the processing target physical CPU 111 is notified to the guest CPU scheduler 129.

In step 1503, the guest CPU scheduler 129 deletes the notified physical CPU number from a scheduling target CPU list of the first guest OS 103. After that, the first guest OS 103 cannot use the physical CPU 111.

In step 1504, the guest CPU scheduler 129 sends a notification of completion of CPU update to the CPU dispatch agent 126.

In step 1505, the CPU dispatch agent 126 receives the notification of completion.

In step 1506, the CPU dispatch agent 126 updates the request log table 131 (specifically, for example, the value of the processing state field 206 corresponding to the detected CPU preempt request is updated to "Completed").

In step 1507, the CPU dispatch agent 126 saves the context to the second context storage area 701. Specifically, for example, the CPU dispatch agent 126 stores the value stored in the register 115 of the physical CPU 111 in the second context storage area 701. The physical CPU 111 is the physical CPU 111 that executes the hypervisor agent 102 (that is, the physical CPU 111 that executes the first guest OS 103).

In step 1508, the CPU dispatch agent 126 submits a trap return instruction (see FIG. 8). When the trap return instruction is submitted, stacks are switched, and the CPU scheduler 121 operating subsequently operates using the CPU scheduler stack area 815.

The process is completed at step 1509.

Figure 16:
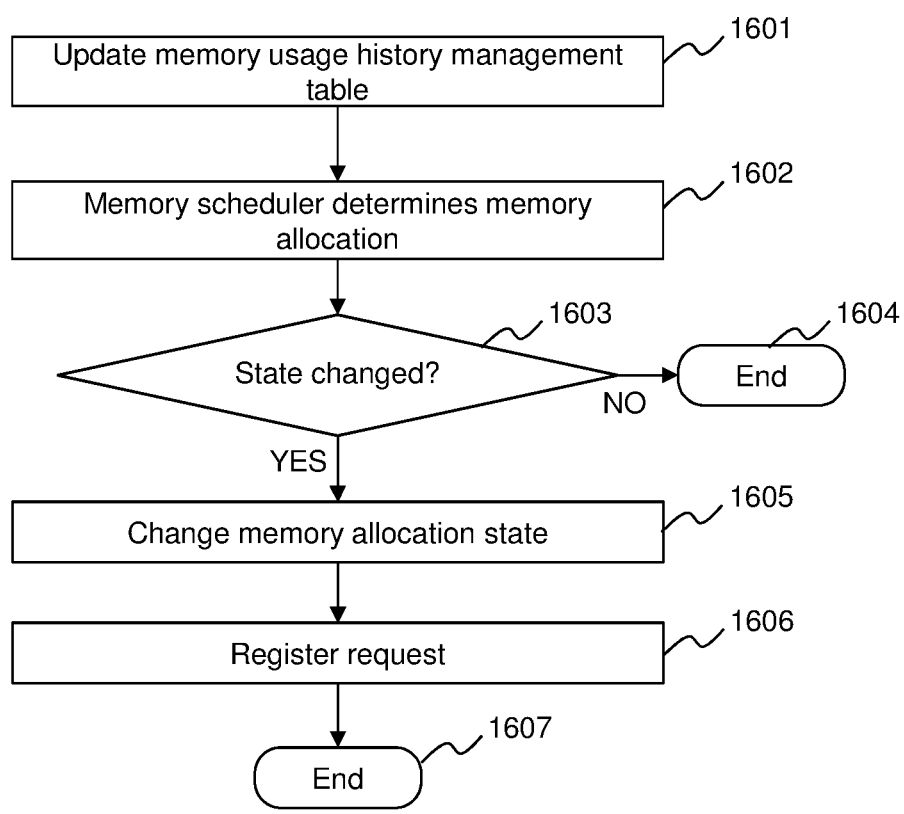
FIG. 16 illustrates an operation flow of a memory scheduler.

FIG. 16 illustrates an operation flow of the memory scheduler 122. The memory scheduler operates regularly.

In step 1601, the memory scheduler 122 performs a process of updating the memory usage history management table 1101. Specifically, for example, the memory scheduler 122 refers to the memory allocation state table 133 to calculate the amount of memory allocated to each guest OS. The memory scheduler 122 adds the calculated amount of allocated memory to the value of the allocated memory aggregate field 1114 of the memory usage history management table 1101 for each guest OS. With this process, it is possible to manage the aggregate of the memory usage records and to charge money corresponding to the aggregate.

In step 1602, the memory scheduler 122 determines a scheduling target memory area (a memory area (page) to be dispatched or preempted) of the first guest OS. In this case, the memory scheduler 122 specifies a range of memory amounts (a combination of the values of the smallest memory amount field 1111 and the largest memory amount field 1112) of the first guest OS 103 from the memory usage history management table 1101. When a value obtained by adding or subtracting the amount of the scheduling target memory area to or from the value of the allocated memory aggregate field 1114 corresponding to the first guest OS 103 exceeds the upper limit of the specified range of memory amounts or is smaller than the lower limit of the specified range of memory amounts, the memory scheduler 122 stops the allocation.

In step 1603, the memory scheduler 122 checks whether there is a change in the amount of memory allocated to the first guest OS.

If there is no change, the memory scheduler 122 completes the process at step 1604.

If there is a change, in step 1605, the memory scheduler 122 updates the memory allocation state table 133. When the submitted request requires a memory dispatch (an increase in the amount of memory allocated) to the first guest OS 103, the memory scheduler 122 determines an allocation target memory area (physical page). The physical page is a physical page of which the allocation destination is not present and which is empty or a page which can be preempted among the physical pages allocated to the second guest OS 104. The values of the guest physical page number field 502 and the allocation destination field 503 of the memory allocation state table 133 are updated to "#" for the physical page. On the other hand, when the request is a preempt request or an address change request for the first guest OS, the updating process of this step is not performed.

In step 1606, the memory scheduler 122 performs a process of registering data to the request log table 131. Specifically, for example, the memory scheduler 122 updates the values of the resource type field 301 and the processing state field 306 corresponding to the request to "Memory" and "In Processing," respectively. When the request is a memory dispatch request for the first guest OS 103, the number field 302 indicates a target physical page number and the old and new state fields 303 and 304 indicate the numbers of the guest OSs to which the physical page is allocated before and after the dispatch process is performed, respectively. When the request is a memory preempt request for the first guest OS 103, the old and new state fields 303 and 304 indicate the numbers of the guest OSs to which the physical page is allocated before and after the dispatch process is performed, respectively.

The process is completed at step 1607.

Figure 17:
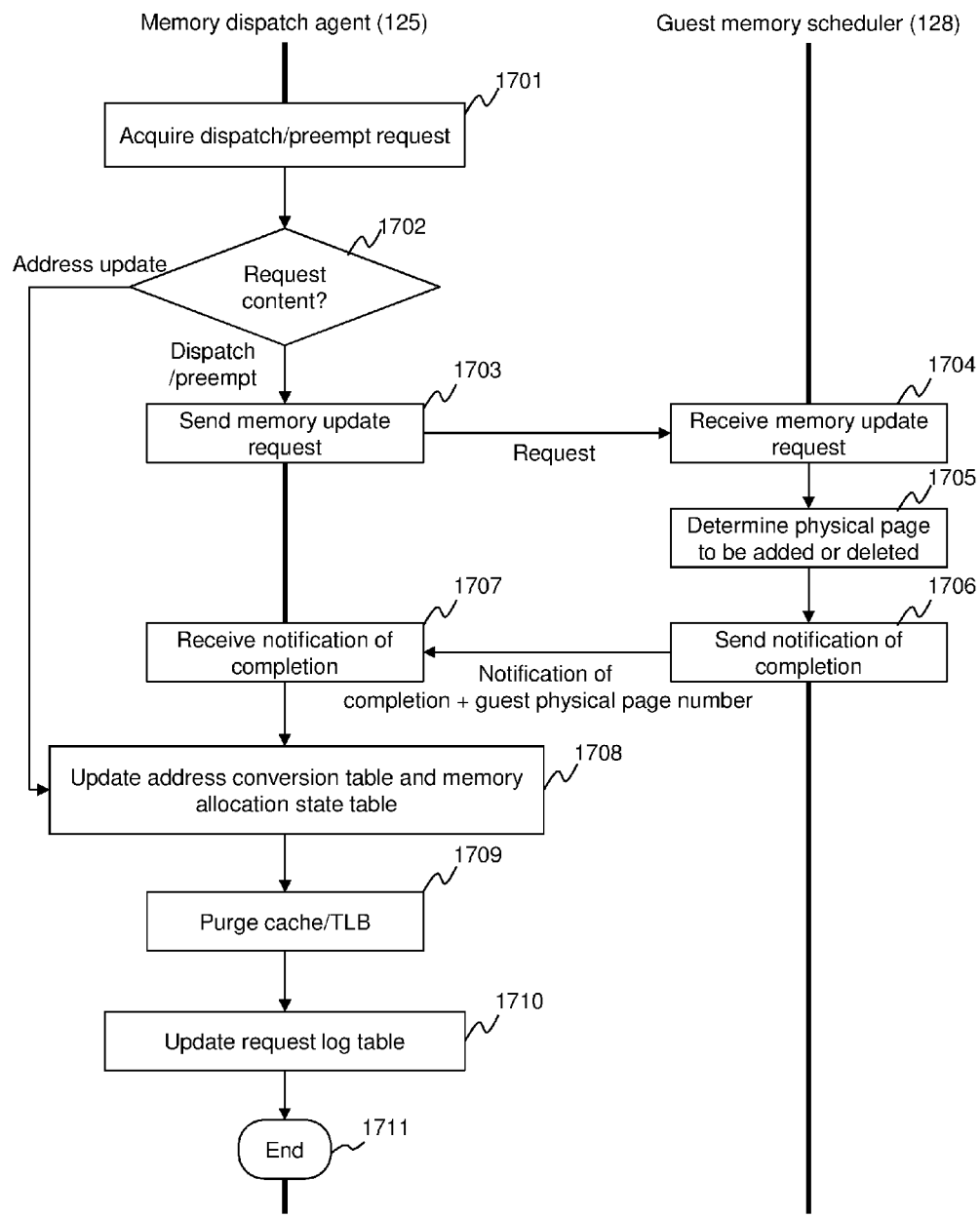
FIG. 17 illustrates an operation flow of a memory dispatch agent and a first guest OS memory scheduler.

FIG. 17 illustrates an operation flow of the memory dispatch agent 125 and the guest memory scheduler 128.

In step 1701, the memory dispatch agent 125 extracts a request of which the value of the resource type field 301 is "Memory" and the value of the processing state field 306 is "In Processing" from the request log table 131.

In step 1702, the memory dispatch agent 125 identifies the extracted request (column). When the number field 302, the old and new state fields 303 and 304 are set, the request is identified to be a memory dispatch request. When the old and new state fields 303 and 304 are set but the number field 302 is not set, the request is identified to be a memory preempt request. When the number field 302 and the new state field 304 are set but the old state field 303 is not set, the request is identified to be an address change request. The flow proceeds to step 1703 when the request is a dispatch/preempt request, and the flow proceeds to step 1708 when the request is an address change request.

In step 1703, the memory dispatch agent 125 submits a memory update request which is a request for updating memory configuration information to the guest memory scheduler 128 of the first guest OS.

In step 1704, the guest memory scheduler 128 receives the request.

In step 1705, in response to the request, the guest memory scheduler 128 adds and delete a page number to and from a physical page list which is a list of guest physical page numbers that the first guest OS can use. In this case, the guest memory scheduler 128 determines a guest physical page number to be added and deleted. If the request is a memory dispatch request, the guest memory scheduler 128 determines a guest physical page number to be added to the list. If the request is a memory preempt request, the guest memory scheduler 128 determines a guest physical page number to be deleted from the list.

In step 1706, the guest memory scheduler 128 sends a notification of completion of memory update to the memory dispatch agent 125. In this case, the guest physical page number determined in step 1705 is notified to the memory dispatch agent 125. The guest physical page number may be included in the request and may be notified separately from the notification of completion (response).

In step 1707, the memory dispatch agent 125 receives the notification of completion and the guest physical page number.

In step 1708, the memory dispatch agent 125 updates the address conversion table 134. When the request is a memory dispatch request, the memory dispatch agent 125 registers a guest OS number indicated by the new state field 304 corresponding to the request, the guest physical page number received in step 1707, and the value of the host physical page number field 603 indicated by the number field 302 corresponding to the request as the values of the guest OS number field 902, the guest physical page number field 903, and the host physical page number field 904 of the address conversion table 134 and updates the value of the V field 901 in the entry in which these values are registered to "1" (Valid). When the request is a memory preempt request, the memory dispatch agent 125 finds an entry having the guest OS number indicated by the new state field 304 corresponding to the request and the guest physical page number received in step 1707 in the guest OS number field 902 and the guest physical page number field 903, respectively, from the address conversion table 134 and updates the value of the V field 901 of the found entry to "0" (Invalid). Further, the memory dispatch agent 125 updates the values of the guest physical page number field 502 and the allocation destination field 503 (see FIG. 5) corresponding to the host physical page number field 904 in the found entry to "#". When the request is an address change request, the memory dispatch agent 125 registers the guest OS number indicated by the new state field 304 corresponding to the request, the guest physical page number indicated by the guest physical page number field 305 corresponding to the request, and the value of the host physical page number field 603 indicated by the number field 302 corresponding to the request as the values of the guest OS number field 902, the guest physical page number field 903, and the host physical page number field 904 of the address conversion table 134, respectively, and updates the value of the V field 901 in the entry in which these values are registered to "1" (Valid).

In step 1709, the memory dispatch agent 125 submits a privileged instruction for performing a cache/TLB purge process—specifically, cache/TLB purge (a process of erasing data in the cache and the TLB). This privileged instruction is received by the physical CPU 111 (the physical CPU 111 that executes the hypervisor 10), and the physical CPU 111 performs the cache/TLB purge process. Here, the cache and the TLB may be areas in the physical memory 112 (protection area).

In step 1710, the memory dispatch agent 125 updates the request log table 131. Specifically, for example, the memory dispatch agent 125 updates the value of the processing state field 306 corresponding to the request to "Completed". Moreover, the memory dispatch agent 125 updates the value of the guest physical page number field 305 to the value received in step 1706. Further, when the request is a memory preempt request, the value of the host physical page number field 904 read in step 1708 is registered as the value of the corresponding number field 302.

The process is completed at step 1711.

Figure 18:
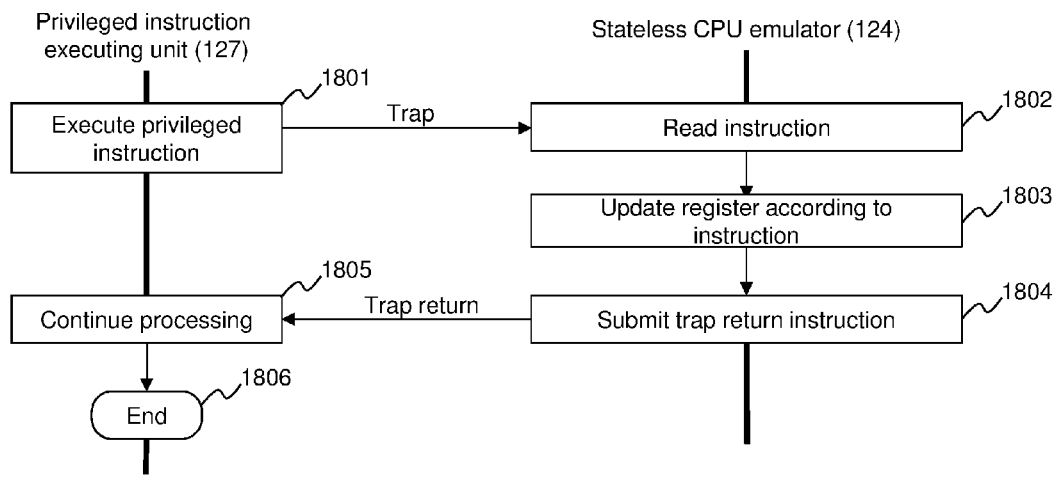
FIG. 18 illustrates an operation flow of a privileged instruction executing unit and a stateless CPU emulator.

FIG. 18 illustrates an operation flow of the privileged instruction executing unit 127 and the stateless CPU emulator 124.

In step 1801, the privileged instruction executing unit 127 executes a privileged instruction. As a result, a trap occurs on the physical CPU 111, and the control is transferred to the stateless CPU emulator 124. For example, a physical CPU of a certain vendor has both a memory emulation function and a CPU emulation function. However, all of these functions are activated or deactivated, and it is not possible to activate only one of both functions. In the present embodiment, although a memory emulation function of a physical CPU is invoked (activated) as means for realizing memory virtualization, since it is not possible to activate only the memory emulation function, the CPU emulation function is also activated. This is an example of a case where a privileged instruction (a trap associated with execution) occurs.

In step 1802, the stateless CPU emulator 124 reads instructions in execution.

In step 1803, the stateless CPU emulator 124 performs a process of updating the physical memory 112 and the register 115 of the physical CPU 111 (the physical CPU 111 that executes the first guest OS 103) according to the read instruction.

In step 1804, the stateless CPU emulator 124 submits a trap return instruction and returns the control to the privileged instruction executing unit 127.

In step 1805, the privileged instruction executing unit 127 continues the process and completes the process at step 1806.

Figure 19:
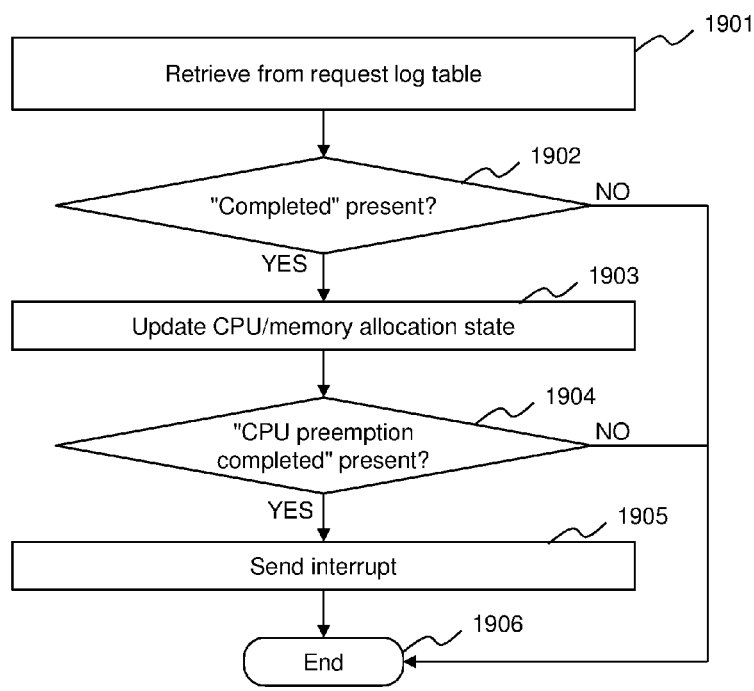
FIG. 19 illustrates an operation flow of a restart control (during regular startup).

FIG. 19 illustrates the flow of a regular operation of the restart control 123.

In step 1901, the restart control 123 finds an entry of which the processing state field 306 is "Completed" from the request log table 131.

In step 1902, the restart control 123 determines whether the entry is found. If the entry is present, the flow proceeds to step 1903. If the entry is not present, the flow proceeds to step 1906.

In step 1903, the restart control 123 updates the CPU allocation state table 132 and the memory allocation state table 133. Specifically, for example, when the entry found in step 1901 is an entry corresponding to a CPU dispatch/preempt request, the restart control 123 updates the value of the allocation destination field 402 corresponding to the number field 302 of the entry to the value indicated by the new state field 304 of the entry. Moreover, for example, when the entry found in step 1901 is an entry corresponding to a memory dispatch request, the restart control 123 updates the value of the allocation destination field 502 in the entry corresponding to the number field 302 of the entry to the value indicated by the new state field 304 of the entry. Further, the restart control 123 updates the value of the guest physical page number field 502 in the entry corresponding to the number field 302 of the entry to the value indicated by the guest physical number field 305 of the entry. Moreover, for example, when the entry found in step 1901 is an entry corresponding to a memory preempt request, the restart control 123 updates the values of the guest physical page number field 502 and the allocation destination field 503 in the entry corresponding to the number field 302 of the entry to "F". Moreover, for example, when the entry found in step 1901 is an entry corresponding to an address update request, the restart control 123 may not perform anything. After performing the updating process, the restart control 123 deletes the entry (the found entry) of the request log table 131.

In step 1904, the restart control 123 determines whether a CPU preemption completion request is included in the entry found in step 1901. The flow proceeds to step 1905 if the request is included, and the flow proceeds to step 1906 if the request is not included.

In step 1905, the restart control 123 sends an interrupt instruction to the target physical CPU 111. By sending this interrupt instruction, the operation of the CPU scheduler 121 which has been stopped in step 1301 can be restarted safely.

The process is completed at step 1906.

Figure 20:
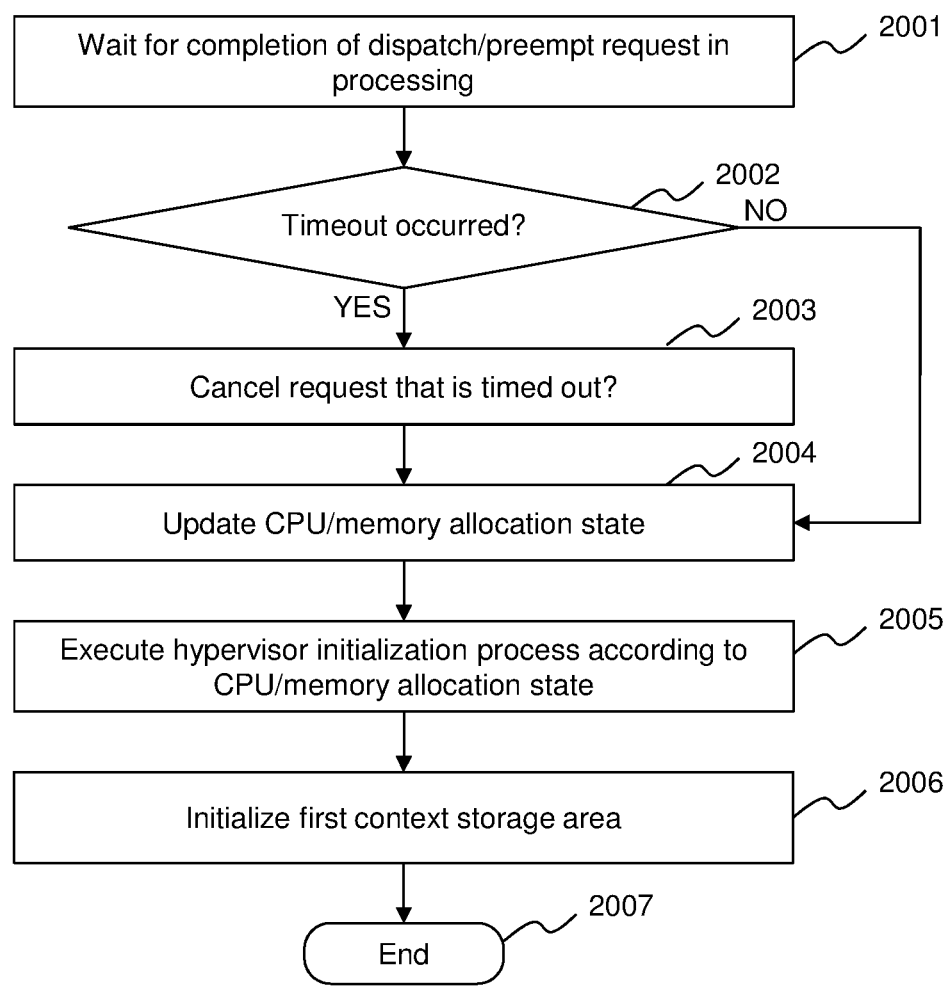
FIG. 20 illustrates an operation flow of a restart control (during restart).

FIG. 20 illustrates an operation flow of the restart control 123 after the hypervisor is restarted due to a fault.

In step 2001, when an entry of which the value of the processing state field 306 is "In Processing" is present in the request log table 131, the restart control 123 performs standby until the processing state is changed to "Completed".

In step 2002, the restart control 123 determines whether a standby period has timed out. The flow proceeds to step 2003 when timeout occurs and the flow proceeds to step 2004 when timeout does not occur.

In step 2003, the restart control 123 cancels the request that has timed out. Specifically, for example, when the timed-out request is a CPU dispatch/preempt request, the restart control 123 specifies the value of the number field 302 in a target entry corresponding to the timed-out request and updates the value of the allocation destination field 402 corresponding to the specified number field 302 to the value of the old state field 303 in the target entry. Moreover, when the timed-out request is a memory dispatch request, the restart control 123 specifies the value of the number field 302 in a target entry corresponding to the timed-out request and updates the values of the guest physical page number field 502 and the allocation destination field 503 corresponding to the specified number field 302 to "F". When the timed-out request is a memory preempt request or an address change request, the restart control 123 may not perform anything. When the cancelling process is completed, the restart control 123 deletes the entry corresponding to the timed-out request from the request log table 131.

In step 2004, the restart control 123 updates the CPU/memory allocation state. In this updating process, similarly to step 1903, the CPU allocation state table 132 and the memory allocation state table 133 are updated according to the registration content of the entry of which the value of the processing state field 306 of the request log table 131 is "Completed".

In step 2005, based on the results of the process, the restart control 123 determines the CPU/memory that the hypervisor 101 and the second guest OS 104 can use and executes a process of initializing (booting) the hypervisor 101 and the second guest OS 104 using the usable CPU/memory only (without using the resources that the hypervisor agent 102 and the first guest OS 103 use). In this way, it is possible to restart the hypervisor 101 and the second guest OS 104 without influencing the hypervisor agent 102 and the first guest OS 103.

In step 2006, the restart control 123 initializes the first context storage area 601. With this initialization, it is guaranteed that the context recovery process of step 1302 is performed safely.

While an exemplary embodiment for describing the present invention has been described, it is not intended to limit the scope of the present invention to this embodiment. The present invention can be embodied in various other forms.

REFERENCE SIGNS LIST

101 Hypervisor
102 Hypervisor agent

103 First guest OS
104 Second guest OS
111 Physical CPU
112 Physical memory (Protection area)
113 Physical memory

The invention claimed is:

1. A computer comprising a plurality of resources including one or more physical memories and a plurality of physical CPUs (Central Processing Units),
the plurality of physical CPUs being configured to execute a hypervisor, a simple hypervisor, a first guest OS (operating system), and a second guest OS,
among the plurality of resources, a resource used by the hypervisor being different from a resource used by the simple hypervisor,
the one or more physical memories including a first physical memory area that is not used by the hypervisor and a second physical memory area that is used by the hypervisor,
the first guest OS being configured to be executed on the simple hypervisor based on the first physical memory area,
the second guest OS being configured to be executed on the hypervisor based on the second physical memory area,
the hypervisor including an emulation function which is a function of virtualizing the plurality of resources as a plurality of virtual resources and a resource scheduling function which is a function of determining resources to be dynamically allocated or deallocated to and from each of the first and second guest OSs,
the simple hypervisor including a scheduling agent function which is a function of allocating or deallocating resources to and from the first guest OS according to the resource scheduling function of the hypervisor, in place of the hypervisor, and
the hypervisor being configured to submit a request associated with allocation or deallocation of resources, and the simple hypervisor being configured to acquire the request and executes a process according to the request;
wherein the request is written to a storage area,
wherein the simple hypervisor is configured to acquire the request from the storage area,
wherein the storage area is a nonvolatile area that stores request log information,
wherein the request is added to the request loci information as a log,
wherein the simple hypervisor is configured to update the log in the request log information based on execution of a process corresponding to the request,
wherein each log in the request log information includes a progress state of a process conforming to a request which corresponds to the log,
wherein the nonvolatile area is configured to further store allocation state information indicating an allocation state of the plurality of resources, and
wherein when the hypervisor is restarted, the hypervisor is configured to refer to the request log information and the allocation state information in the nonvolatile area, perform standby until a process for a request in processing is completed, update the allocation state information based on the request log information, and initialize the hypervisor and the second guest OS in use of a resource which is not allocated to the first quest OS among the plurality of resources based on the updated allocation state information.

2. The computer according to claim 1, wherein
a second physical CPU different from a first physical CPU that executes the hypervisor is configured to execute the simple hypervisor, and
the submission of the request is submission of a trap instruction or a notification of interruption of the second physical CPU.

3. The computer according to claim 1, wherein
when the request is a CPU allocation request, the simple hypervisor is configured to start operating on an allocation target physical CPU and notify the first guest OS that the allocation target physical CPU has become usable, and
when the request is a CPU deallocation request, the simple hypervisor is configured to notify the first guest OS of a deallocation target physical CPU among physical CPUs allocated to the first guest OS and stop operating on the deallocation target physical CPU.

4. The computer according to claim 3, wherein
the submission of the CPU allocation request is submission of a trap instruction, and
the submission of the CPU deallocation request is submission of a notification of interruption of the physical CPU that has become unusable.

5. The computer according to claim 1, wherein
when the request is a memory allocation request, the simple hypervisor is configured to update address conversion information showing correspondence between a guest address which is a logical address designated from the first guest OS and a host address which is a physical address of a memory area of the one or more physical memories so that an allocation target memory area among the one or more physical memories can be accessed from the first guest OS and notifies the first guest OS that the allocation target memory area has become usable, and
when the request is a memory deallocation request, the simple hypervisor is configured to notify the first guest OS of an unusable memory area among memory areas that are allocated to the first guest OS and update the address conversion table so that the unusable memory area cannot be accessed from the first guest OS.

6. The computer according to claim 1, wherein
the first guest OS, the simple hypervisor, and address conversion information showing correspondence between a guest address which is a logical address designated from the first guest OS and a host address which is a physical address of a memory area of the one or more physical memories are arranged in the first memory area, and
the first memory area is an area in which data cannot be written from the hypervisor and the second guest OS.

7. The computer according to claim 6, wherein
the hypervisor is configured to submit an address change request for controlling a memory area that can be accessed from the second guest OS, and
the simple hypervisor is configured to update the address conversion information according to the address change request.

8. The computer according to claim 1, wherein
when a privileged instruction is submitted from the first guest OS, the simple hypervisor is configured to update a value of a register based on the privileged instruction, in place of the hypervisor.

9. The computer according to claim 1, wherein
the hypervisor is configured to specify a range of usable resource amounts for each guest OS, and when allocation or deallocation of resources is executed according to a target request and the amount of resources allocated does not belong to the specified range, the hypervisor is configured to stop submitting the request.

10. The computer according to claim 1, wherein
the hypervisor is configured to manage an allocation resource amount which is a resource amount allocated to each guest OS, and
the hypervisor is configured to update the allocation resource amount according to allocation or deallocation of resources to and from each guest OS.

11. A resource scheduling method of performing resource scheduling with the aid of a hypervisor in a computer having a plurality of resources including one or more physical memories and a plurality of physical CPUs (Central Processing Units), the method comprising:
providing a first physical memory area that is not used by the hypervisor and a second physical memory area that is used by the hypervisor in the one or more physical memories and executing a simple hypervisor in use of a resource different from the resource used by the hypervisor among the plurality of resources; executing a first guest OS (operating system) based on the first physical memory area on the simple hypervisor and executing a second guest OS based on the second physical memory area on the hypervisor, the hypervisor having an emulation function which is a function of virtualizing the plurality of resources as a plurality of virtual resources and a resource scheduling function which is a function of determining resources to be dynamically allocated or deallocated to and from each of the first and second guest OSs, and the simple hypervisor having a scheduling agent function which is a function of allocating or deallocating resources to and from the first guest OS according to the resource scheduling function of the hypervisor, in place of the hypervisor;
causing the hypervisor to submit a request for allocation or deallocation of resources;
causing the simple hypervisor to acquire the request and to execute a process according to the request;
causing the simple hypervisor to acquire the request, which is written to a storage area, from the storage area, wherein the storage area is a nonvolatile area that stores request log information and the request is added to the request log information as a log;
causing the simple hypervisor to update the loci in the request log information based on execution of a process corresponding to the request, wherein each log in the request log information includes a progress state of a process conforming to a request which corresponds to the log, wherein the nonvolatile area is configured to further store allocation state information indicating an allocation state of the plurality of resources; and
when the hypervisor is restarted, causing the hypervisor to refer to the request log information and the allocation state information in the nonvolatile area, perform standby until a process for a request in processing is completed, update the allocation state information based on the request log information, and initialize the hypervisor and the second guest OS in use of a resource which is not allocated to the first quest OS among the plurality of resources based on the updated allocation state information.

12. The resource scheduling method according to claim 11, further comprising:
when the request is a CPU allocation request, causing the simple hypervisor to start operating on an allocation target physical CPU and notify the first guest OS that the allocation target physical CPU has become usable;
when the request is a CPU deallocation request, causing the simple hypervisor to notify the first guest OS of a deallocation target physical CPU among physical CPUs allocated to the first guest OS and stop operating on the deallocation target physical CPU;
when the request is a memory allocation request, causing the simple hypervisor to update address conversion information showing correspondence between a guest address which is a logical address designated from the first guest OS and a host address which is a physical address of a memory area of the one or more physical memories so that an allocation target memory area among the one or more physical memories can be accessed from the first guest OS and notifies the first guest OS that the allocation target memory area has become usable; and
when the request is a memory deallocation request, causing the simple hypervisor to notify the first guest OS of an unusable memory area among memory areas that are allocated to the first guest OS and update the address conversion table so that the unusable memory area cannot be accessed from the first guest OS.

13. The resource scheduling method according to claim 11, further comprising:
when a privileged instruction is submitted from the first guest OS, causing the simple hypervisor to update a value of a register based on the privileged instruction, in place of the hypervisor.

14. A resource scheduling method of performing resource scheduling with the aid of a hypervisor in a computer having a plurality of resources including one or more physical memories and a plurality of physical CPUs (Central Processing Units), the method comprising:
providing a first physical memory area that is not used by the hypervisor and a second physical memory area that is used by the hypervisor in the one or more physical memories and executing a simple hypervisor in use of a resource different from the resource used by the hypervisor among the plurality of resources;
executing a first guest OS (operating system) based on the first physical memory area on the simple hypervisor and executing a second guest OS based on the second physical memory area on the hypervisor, the hypervisor having an emulation function which is a function of virtualizing the plurality of resources as a plurality of virtual resources and a resource scheduling function which is a function of determining resources to be dynamically allocated or deallocated to and from each of the first and second guest OSs, and the simple hypervisor having a scheduling agent function which is a function of allocating or deallocating resources to and from the first guest OS according to the resource scheduling function of the hypervisor, in place of the hypervisor;
causing the hypervisor to submit a request for allocation or deallocation of resources;
causing the simple hypervisor to acquire the request and to execute a process according to the request;
causing the simple hypervisor to acquire the request, which is written to a storage area, from the storage area, wherein the storage area is a nonvolatile area that stores request log information and the request is added to the request log information as a log;

causing the simple hypervisor to update the log in the request log information based on execution of a process corresponding to the request, wherein each log in the request log information includes a progress state of a process corresponding to a request which corresponds to the log;

when the request is a CPU deallocation request, causing the simple hypervisor to notify the first guest OS of a deallocation target physical CPU among physical CPUs allocated to the first guest OS and stop operating on the deallocation target physical CPU; and causing the hypervisor to wait for a notification of interruption after the simple hypervisor stops operating according to the CPU deallocation request, specify a progress state of a process corresponding to the CPU deallocation request from the reference list, and send the notification of interruption of the deallocation target physical CPU when the specified progress state indicates completion.

15. The resource scheduling method according to claim 14, further comprising:

when the request is a CPU allocation request, causing the simple hypervisor to start operating on an allocation target physical CPU and notify the first guest OS that the allocation target physical CPU has become usable;

when the request is a memory allocation request, causing the simple hypervisor to update address conversion information showing correspondence between a guest address which is a logical address designated from the first guest OS and a host address which is a physical address of a memory area of the one or more physical memories so that an allocation target memory area among the one or more physical memories can be accessed from the first guest OS and notifies the first guest OS that the allocation target memory area has become usable; and when the request is a memory deallocation request, causing the simple hypervisor to notify the first guest OS of an unusable memory area among memory areas that are allocated to the first guest OS and update the address conversion table so that the unusable memory area cannot be accessed from the first guest OS.

16. The resource scheduling method according to claim 14, further comprising:

when a privileged instruction is submitted from the first guest OS, causing the simple hypervisor to update a value of a register based on the privileged instruction, in place of the hypervisor.

17. A computer comprising a plurality of resources including one or more physical memories and a plurality of physical CPUs (Central Processing Units), the plurality of physical CPUs being configured to execute a hypervisor, a simple hypervisor, a first guest OS (operating system), and a second guest OS, among the plurality of resources, a resource used by the hypervisor being different from a resource used by the simple hypervisor, the one or more physical memories including a first physical memory area that is not used by the hypervisor and a second physical memory area that is used by the hypervisor, the first guest OS being configured to be executed on the simple hypervisor based on the first physical memory area, the second guest OS being configured to be executed on the hypervisor based on the second physical memory area, the hypervisor including an emulation function which is a function of virtualizing the plurality of resources as a plurality of virtual resources and a resource scheduling function which is a function of determining resources to be dynamically allocated or deallocated to and from each of the first and second guest OSs, the simple hypervisor including a scheduling agent function which is a function of allocating or deallocating resources to and from the first guest OS according to the resource scheduling function of the hypervisor, in place of the hypervisor, and the hypervisor being configured to submit a request associated with allocation or deallocation of resources, and the simple hypervisor being configured to acquire the request and executes a process according to the request;

wherein the request is written to a storage area, wherein the simple hypervisor is configured to acquire the request from the storage area, wherein the storage area is a nonvolatile area that stores request log information, wherein the request is added to the request log information as a log, wherein the simple hypervisor is configured to update the log in the request log information based on execution of a process corresponding to the request, wherein each log in the request log information includes a progress state of a process corresponding to a request which corresponds to the log, wherein when the request is a CPU deallocation request, the simple hypervisor is configured to notify the first guest OS of a deallocation target physical CPU among physical CPUs allocated to the first guest OS and stop operating on the deallocation target physical CPU, and wherein the hypervisor is configured to wait for a notification of interruption after the simple hypervisor stops operating according to the CPU deallocation request, specify a progress state of a process corresponding to the CPU deallocation request from the reference list, and send the notification of interruption of the deallocation target physical CPU when the specified progress state indicates completion.

18. The computer according to claim 17, wherein when the request is a CPU allocation request, the simple hypervisor is configured to start operating on an allocation target physical CPU and notify the first guest OS that the allocation target physical CPU has become usable, when the request is a memory allocation request, the simple hypervisor is configured to update address conversion information showing correspondence between a guest address which is a logical address designated from the first guest OS and a host address which is a physical address of a memory area of the one or more physical memories so that an allocation target memory area among the one or more physical memories can be accessed from the first guest OS and notifies the first guest OS that the allocation target memory area has become usable, and when the request is a memory deallocation request, the simple hypervisor is configured to notify the first guest OS of an unusable memory area among memory areas that are allocated to the first guest OS and update the address conversion table so that the unusable memory area cannot be accessed from the first guest OS.

19. The computer according to claim 17, wherein when a privileged instruction is submitted from the first guest OS, the simple hypervisor is configured to update a value of a register based on the privileged instruction, in place of the hypervisor.

20. The computer according to claim 17, wherein the hypervisor is configured to specify a range of usable resource amounts for each guest OS, and when allocation or deallocation of resources is executed according to a target request and the amount of resources allocated does not belong to the specified range, the hypervisor is configured to stop submitting the request.

* * * * *